United States Patent

Petersen et al.

[11] 3,963,559

[45] June 15, 1976

[54] SPRAY DRYING DEVICE FOR THE PRODUCTION OF POWDER, E.G. MILK POWDER

[76] Inventors: Mogens Petersen, No. 31 Tjornevej, 2800 Lyngby; Klaus Erik Gude, No. 22 Viekaer, 2950 Vedbaek, both of Denmark

[22] Filed: July 24, 1974

[21] Appl. No.: 491,192

Related U.S. Application Data

[63] Continuation of Ser. No. 218,367, Jan. 17, 1972, abandoned.

[30] Foreign Application Priority Data

Jan. 19, 1971   Denmark .............................. 209/71

[52] U.S. Cl. ................................. 159/4 S; 159/4 D
[51] Int. Cl.² ............................................ B01D 1/16
[58] Field of Search ....................... 159/4 D, 48 R

[56]   References Cited
       UNITED STATES PATENTS

| 1,756,772 | 4/1930  | Weissberg et al. ............... | 159/4 S |
| 1,989,406 | 1/1935  | Doolittle........................... | 159/4 S |
| 2,010,101 | 8/1935  | MacLachlam et al. ............ | 159/4 S |
| 2,559,989 | 7/1951  | Nyrop ............................... | 159/4 B |
| 2,576,297 | 11/1951 | Horseley et al. .................. | 159/4 D |
| 2,747,660 | 5/1956  | Campbell........................... | 159/48 R |

FOREIGN PATENTS OR APPLICATIONS

| 65,538   | 8/1947 | Denmark ........................... | 159/4 S |
| 1,125,265 | 3/1962 | Germany ........................... | 159/4 S |

*Primary Examiner*—Jack Sofer
*Attorney, Agent, or Firm*—Sughrue, Rothwell, Mion, Zinn & Macpeak

[57]   ABSTRACT

A spray drying device for the production of powders, more particularly milk powder, a drying chamber 1, an atomizer wheel 5, means 12 for supplying a solution to be dried as well as means 4 for supplying drying air and a cyclone 9 for separating the powder that is produced the air and powder outlet 11, of the cyclone provides a direct communication with a zone adjacent to the atomizer wheel and terminates coaxially with it, said communication providing an unobstructed passage for the cyclone air towards the wheel.

7 Claims, 8 Drawing Figures

FIG.1

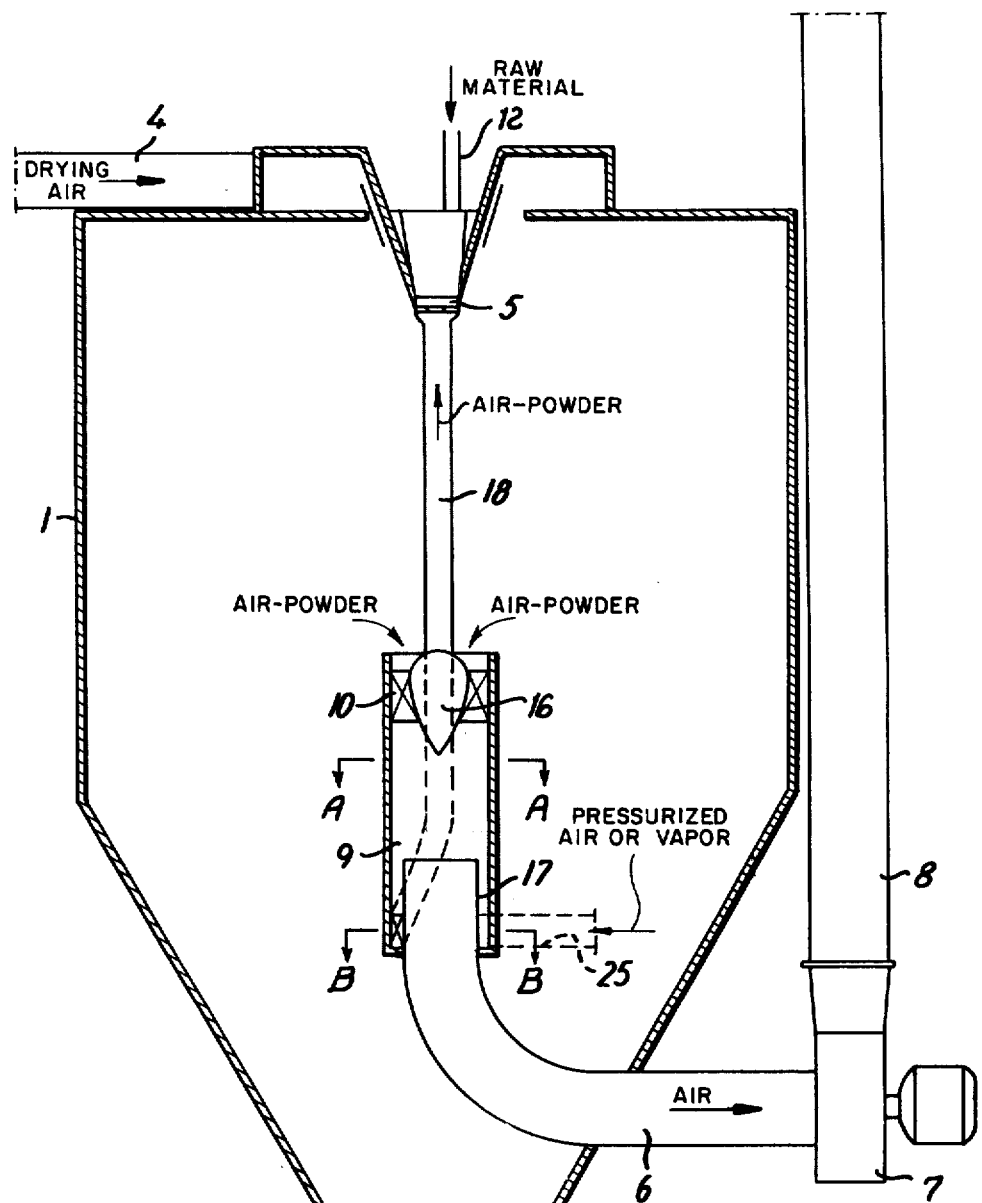
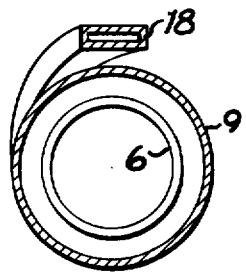
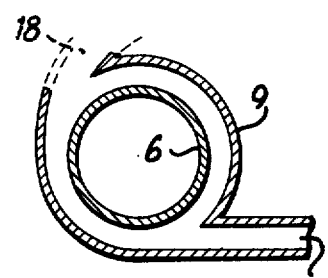

SPRAY DRYING DEVICE FOR THE PRODUCTION OF POWDER, E.G. MILK POWDER

This is a continuation, of application Ser. No. 218,367, filed Jan. 17, 1972 now abandoned.

The present invention relates to a spray drying device for the production of powder, e.g. milk powder, by spray-drying a solution or dispersion of solids consisting of a drying chamber in which an atomizer wheel is mounted, a unit for supplying the solution or dispersion to the atomizer wheel, a drying air installation, a powder outlet and a drying air outlet pipe, a cyclone for separating the powder from the exhausted drying air and means for recirculating the powder from the cyclone to the atomizing zone of the drying chamber.

In the prior art devices of this type, the powder is separated from the discharge gas in the cyclone and removed through a gas-lock valve, from where the powder is passed along by pneumatic means to the point of injection in the chamber. The gas-lock valve serves to separate the dicharge gas from the transport gas.

Recirculating the powder to the atomizing zone aims at a certain degree of agglomeration between moist particles in the atomizing zone and the dry and fairly fine particles that are recirculated from the discharge gas.

It has been found, however, that it is possible to obtain a powder that possesses significantly improved properties by means of a device according to the invention that is characteristic in that the powder outlet pipe of the cyclone provides a direct communication with a zone adjacent to the atomizer wheel and terminates coaxially with the wheel, which communication permits an unobstructed passage of gas from the cyclone to said area.

It has been found that it is possible to obtain a powder possessing particularly good properties with such a device, these properties include a high powder bulk density and a small amount of air occluded inside the individual grains of powder and the capacity of sinking rapidly when being redissolved.

An additional advantage offered by the device according to the invention consists in that it is possible to achieve a reduction in the waste of material in the ejected discharge gas due to the circumstance that a more effective separation is obtained in the cyclone which, on the one hand, is due to the direct exhausting from the cyclone without the use of gas-lock valves, and, on the other hand, due to the greater particle density attained by the device.

In a particularly expedient embodiment of the device according to the invention, this is constructed in such a way that the cyclone is built into the chamber coaxially with the atomizer wheel and in direct communication with the drying air pipe in such a way that it constitutes the gas discharge pipe of the cyclone, while the cyclone inlet communicates directly with the inside of the chamber.

Hereby an appreciable shortening of the distance over which the powder that is separated in the cyclone has to be transported is brought about and, thereby, a gentler treatment of it and, at the same time, a significant saving in space is achieved since it is generally not necessary to increase the dimensions of the drying chamber on account of the cyclone being mounted therein as the circumstance of it being mounted coaxially in the drying chamber, in essence, merely means a utilization of the space always present in the central portion of a drying chamber of a spray drying device of the type dealt with here, which would otherwise not serve any useful purpose.

The invention is described below in greater detail with reference to the accompanying drawings, in which FIG. 1 diagrammatically shows an embodiment of a spray drying device according to the invention seen in axial section, FIG. 2 shows a detail of this device on a larger scale, while FIGS. 3, and 4 show various embodiments of the device according to the invention shown diagrammatically in axial section, FIG. 4A shows a cross-section as taken along lines A—A in FIG. 4.

FIG. 4B shows a cross-section as taken along lines B—B in FIG. 4, and

Figure 1:
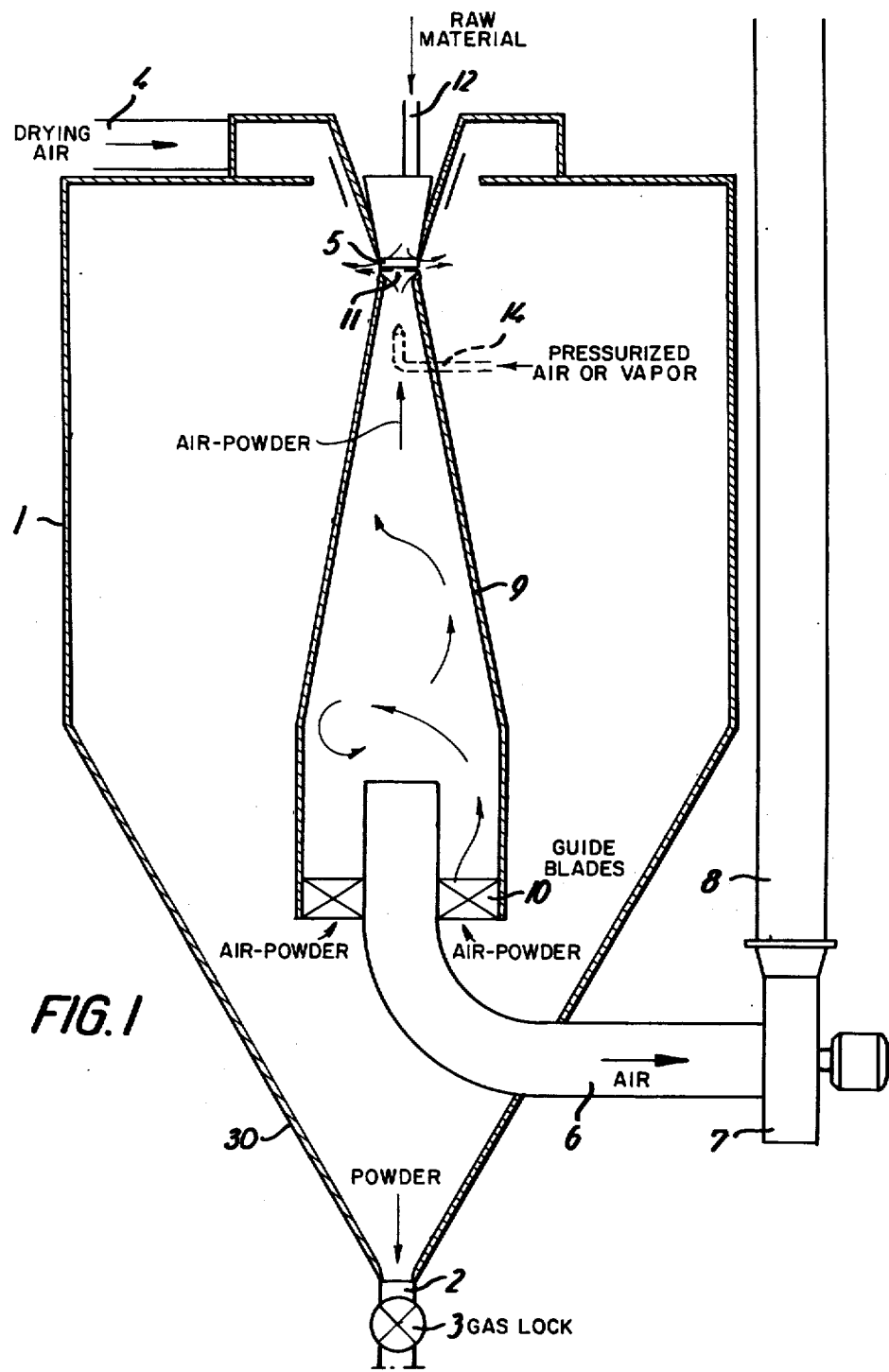

The device illustrated in FIG. 1 comprises a conventional drying chamber 1, the topmost portion of which is cylindrical and whose lowermost portion is conical and which, in the lower point, is provided with a powder outlet 2 equipped with a gas-lock valve 3. In addition, the drying chamber has a drying air inlet 4 for supplying drying air through the ceiling of the atomizer with a rotating movement around an atomizer wheel 5 mounted coaxially at the top of the chamber. Finally, the chamber is provided with an air outlet 6, through which the stale air is exhausted by means of a blower 7 and ejected via a discharge pipe 8.

In the embodiment shown, communicating with outlet 6, a cyclone 9 has been incorporated into drying chamber 1 coaxially with it.

Outlet 6 constitutes the air outlet from cyclone 9 and issues coaxially from its open lower end. In the area around outlet 6, guide blades 10 are fitted to impart a rotating movement, in the cyclone, to the air that, due to the extraction via outlet 6, is drawn by suction from chamber 1 via guide blades 10 to cyclone 9.

The powder outlet of the cyclone faces upwardly in that the cyclone opens out below the atomizer wheel 5 with an unobstructed aperture 11. Pipe 12 supplies a solution or dispersion of solids to the atomizer wheel 5.

Through the rotation of the atomizer wheel it acts as a fan and thereby draws powder and a part of the discharged air out by suction from the cyclone through aperture 11. In order to intensify the ventilating effect, wheel 5, on its underside, is provided with radial ribs 13 as can be seen more clearly in FIG. 2.

In this manner, a part of the discharged air is recirculated together with a powder that has been separated in cyclone 9 and is passed directly into the atomizing zone of atomizer wheel 5.

Due to this, an immediate blending of the air introduced via air inlet 4 and the recirculated volume of air takes place so that the drying potential is reduced and the drying process is effected in a gentler manner, in spite of a high temperature of the air supplied.

By the separated particles from cyclone 9 being transported to the atomizing zone by means of the recirculated air, the detrimental mechanical treatment to which the recirculated powder is subjected in the prior art devices is avoided where this powder is removed from a cyclone through a gas-lock valve and, by means of a pneumatic transport system, is conveyed to the drying chamber.

Figure 2:
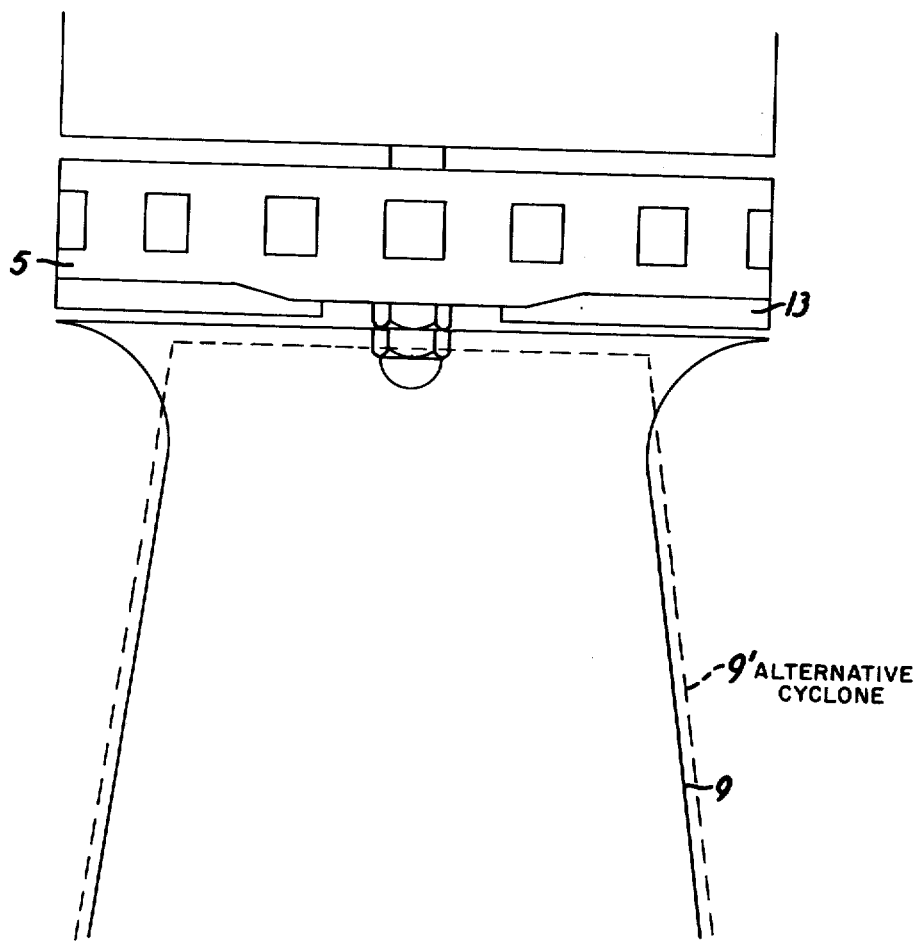

As illustrated in FIG. 2, the cyclone of the embodiment has, in the close proximity of the atomizer wheel, a trumpet-shaped orifice, the largest diameter of which is equal to the diameter of the atomizer wheel. The ribs 13 that are fitted to the underside of the wheel may, by way of example, have a height of between 2 and 20 mm, while the unobstructed gap between the orifice edge and the ribs may vary between 2 and 5 mm.

It is possible, however, for the cyclone to continue taperingly right up to its topmost open end, the way this is indicated with dotted lines in FIG. 2 and marked with 9'.

In order to intensify the extraction from the cyclone, as indicated with dotted lines in FIG. 1, a pipe 14 may be inserted coaxially in the topmost end of cyclone 9 with an upwardly-facing aperture for supplying compressed air or vapour, due to which the extraction from the cyclone is intensified by the ejection effect.

Figure 3:
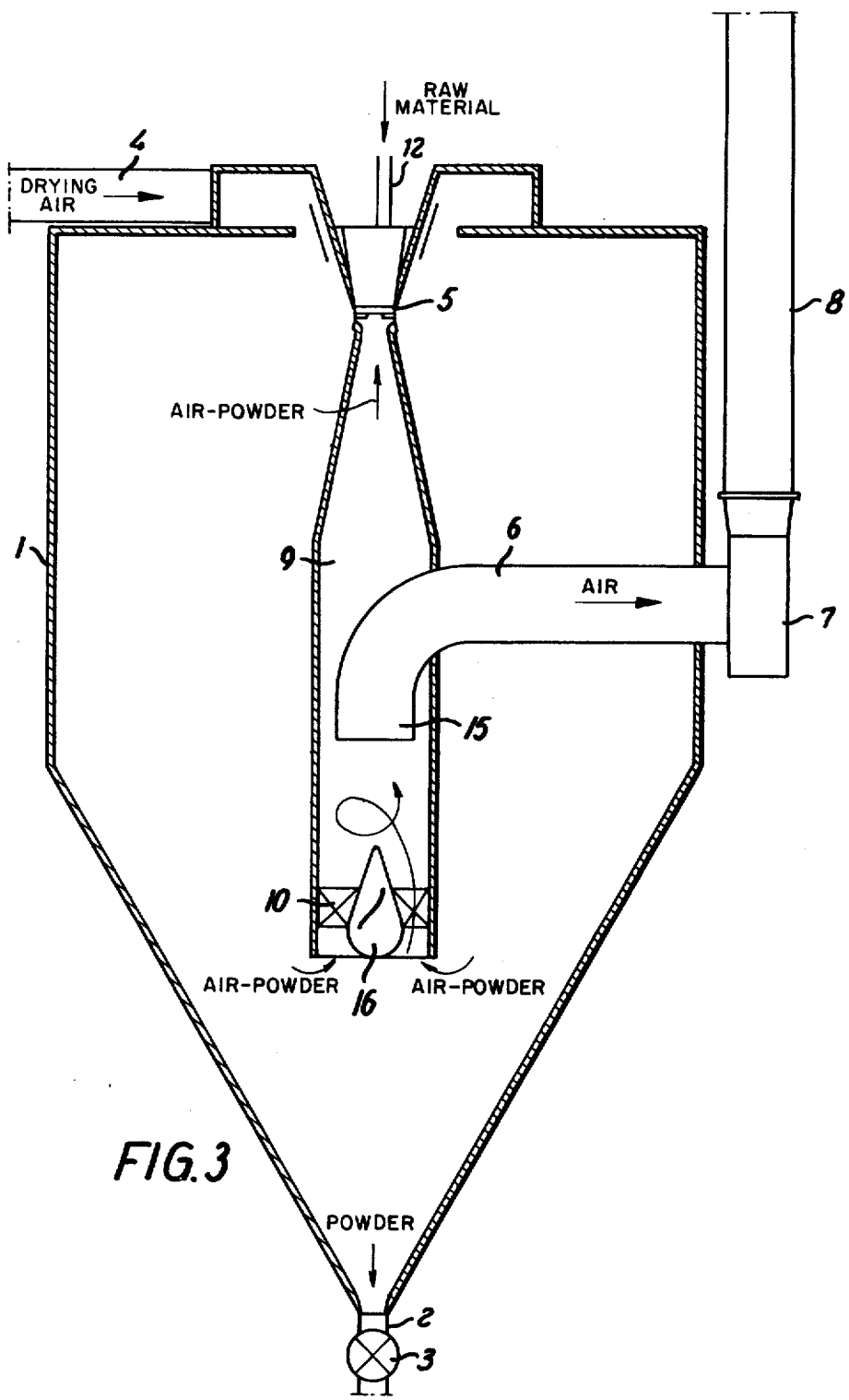

In the embodiment illustrated in FIG. 3, the air outlet 6 has a downwardly-facing opening 15 in cyclone 9 and guide blades 10 surround a coaxially mounted streamlined filling body 16. For the rest, this embodiment corresponds fully to the one shown in FIG. 1.

In FIG. 4, the air-powder inlet of cyclone 9 in which guide blades or vanes 10 corresponding to those shown in FIG. 3 are provided, faces upwardly. Some air is withdrawn from the cyclone through air outlet 6 in which a blower 7 is mounted, and ejected through discharge pipe 8. Powder separated in the cyclone flows together with the remainder of the air through a pipe 18 which issues tangentially from the lower, closed end of the cyclone 9, said pipe 18 extending upwardly towards the atomizer wheel 5, as shown in detail in FIGS. 4A and 4B. The arrangement of the outlet opening of pipe 18 relative to wheel 5 corresponds to that shown in FIGS. 1 and 2. In order to promote the flow of powder upwards through pipe 18, a pipe 25 for supplying pressurized air or vapour may open tangentially into the cyclone at the level of the inlet opening to pipe 18, as also shown in FIG. 4B.

The embodiment shown in FIGS. 7 and 8 differs from the one shown in FIG. 1 in that the powder is not removed via a gas-lock valve but in that, in its place, a number of air plenums are formed in the bottom of the drying chamber, whereby the powder, prior to leaving the drying chamber, is subjected to a finishing treatment, for example, by being cooled.

The funnel-shaped portion 30 of chamber 1 is truncated at the bottom and a dihedral roof-shaped separating portion 31 is inserted so as to produce two parallel powder off-take channels 32 in the bottom of the chamber. Each of these channels is open at the bottom with an elongated, rectangular aperture that is surrounded by a flange 33. To each flange 33, a box-shaped portion 34 is secured and in each of these portions perforated plates 35 are secured which decline towards the center of the box where, in the bottom of the box, a powder outlet connecting piece 36 is mounted.

An air intake connection 37 is fitted underneath the center of each of the perforated plates 35 in the bottom of boxes 34, thus altogether four air plenums with four air inlets being provided which, however, have only two powder outlets.

The powder dropping through drying chamber 1 onto the perforated plates 35 is kept moving briskly by means of the air supplied via air intakes 37 which, for instance, may be cooling air at ambient temperature so that the warm powder is cooled. Due to the plates being mounted in a declined position, the powder moves towards the powder outlet connecting pieces 36.

The air introduced via connections 37 mixes, after having passed the perforated plates and the material kept in brisk movement on and above these plates, with the drying air in the lower part of chamber 1 and is removed together with it via cyclone 9. When passing through the powder layer above the perforated plates 35, this air carries along a quantity of fine particles and these particles, too, are separated in the cyclone and are recirculated towards the atomizer wheel.

Figure 5:
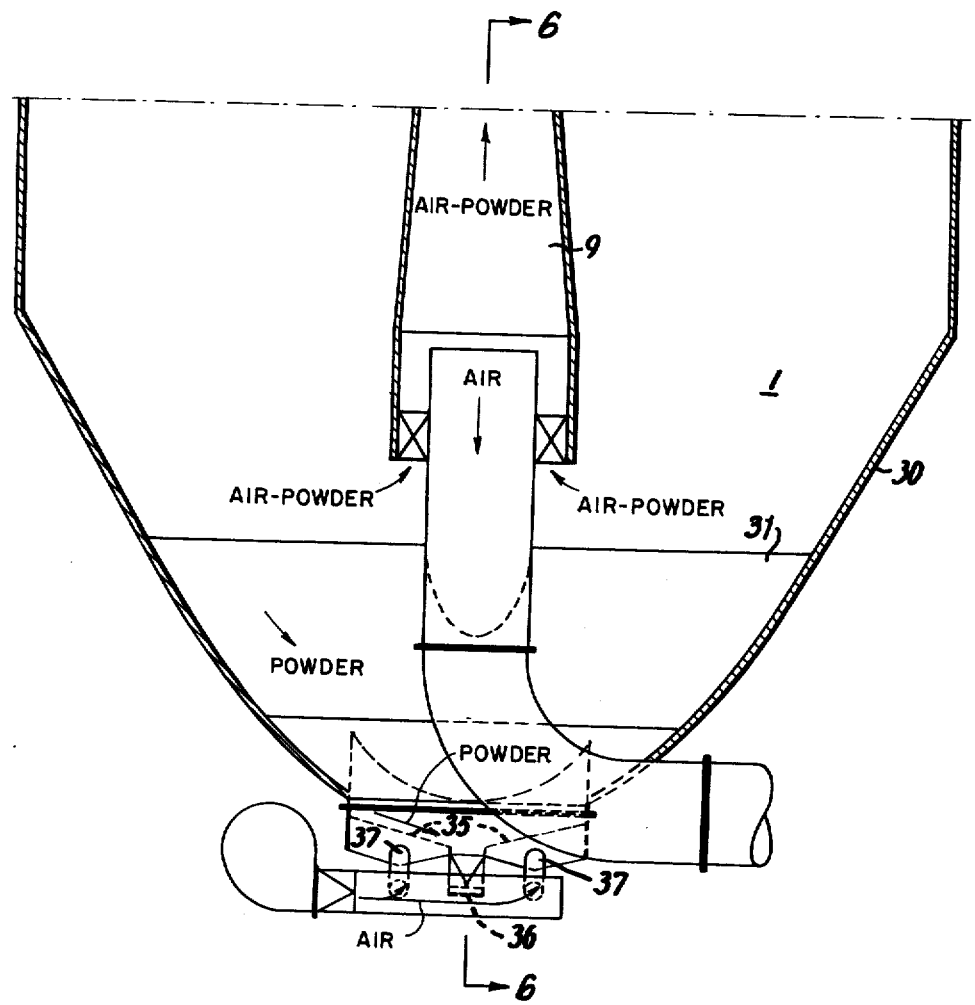
FIGS. 5 and 6 show a modified construction of the embodiment shown in FIG. 1 seen in two axial sections at right angles to each other.
Figure 6:
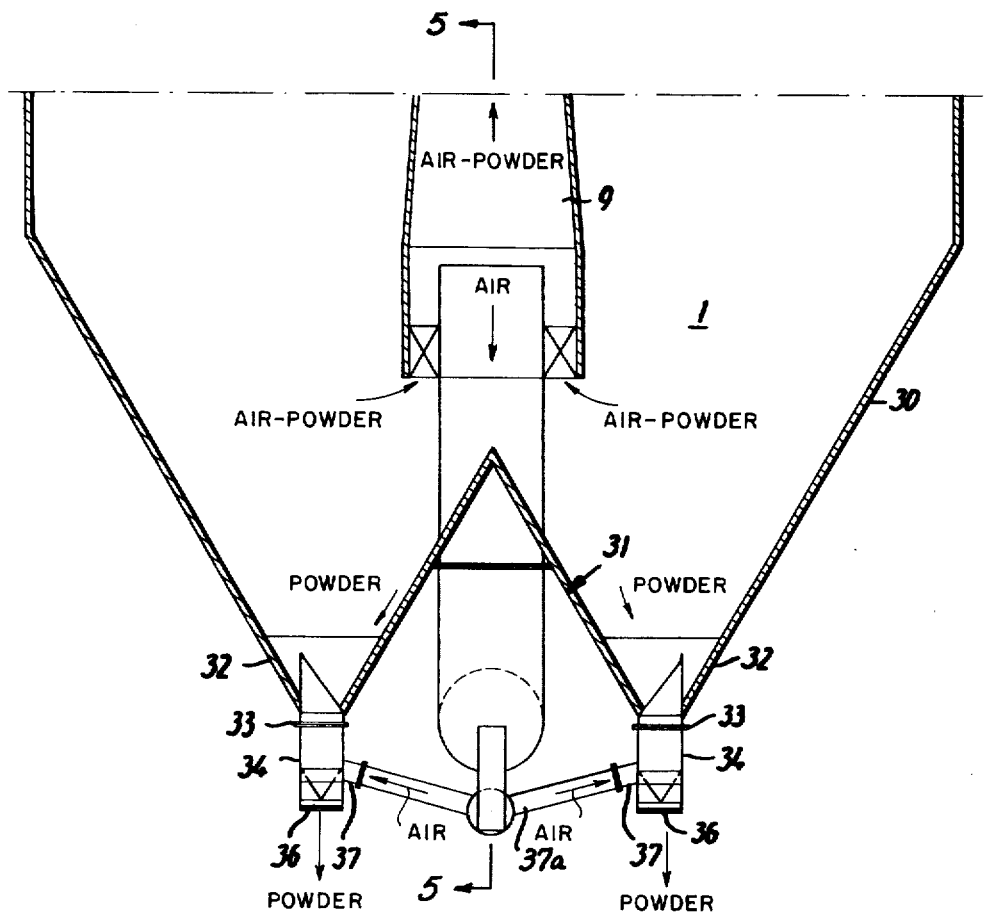

The embodiment according to FIGS. 5 and 6 is described in the foregoing as a modification of the embodiment shown in FIG. 1, it is, however, possible, to likewise modify the embodiments shown in the other preceding figures.

The embodiments shown in FIGS. 1–4 may be mounted vertically with the atomizer wheel situated topmost as illustrated in the drawings, but it is possible to mount them in any required position, e.g. reversedly with the atomizer wheel being situated at the bottom. On the other hand, the embodiment shown in FIGS. 7 and 8 is only suited to being mounted in a vertical position with the atomizer wheel being located at the top, as is shown in the figures.

EXAMPLE 1

A device corresponding to the one shown in FIG. 1 is used in which the cylindrical portion of the drying chamber has a diameter of 2.30 m.

The dimensions of the cyclone are:

| | |
|---|---|
| Total height | 2550 mm |
| Cylindrical height | 850 mm |
| Diameter | 430 mm |

The diameter of the outlet in the pointed end of the conical portion is: 80 mm.

Skimmed milk concentrate was supplied to the atomizer wheel. The inlet temperature of the drying air was 185°C and the outlet temperature was 87°C.

The atomizer wheel was of the conventional type with radial ducts, its diameter was 120 mm and its direction of rotation the same as the direction of rotation of the air vortex in the cyclone.

On its underside, the atomizer wheel was fitted with 8 ribs, 5 mm in height, and the distance from the ribs to the topmost edge of the cyclone was 5 mm.

The number of revolutions of the atomizer wheel were 15,000 rpm.

A spray-dried skimmed milk product of good quality was obtained which corresponded to "Extra grade requirements for non-fat milk", as stated in "Standards for Grades of Dry Milks Including Methods of Analysis" (A.D.M.I. Bulletin No. 916, U.S.A. 1965).

The drying air leaving the unit contained a quantity of powder which corresponded to 16% of the total spray-dried quantity. (In prior art devices of a similar type provided with a conventional cyclone with a gas-lock valve for discharging the separated powder, the quantity of powder that is removed with the drying air normally constitutes approximately 35%).

EXAMPLE 2

The device employed corresponded to the one used in Example 1.

The number of revolutions of the atomizer wheel were changed to 18,000 rpm and the pointed end of the cyclone was constructed shaped like a trumpet, that is to say, with an outwardly-projecting collar having a diameter of 120 mm. The width of the gap between the ribs of the atomizer wheel and the topmost edge of the cyclone was 2 mm. The remaining test conditions were the same as in Example 1.

The product obtained possessed similar properties as those of the product obtained in Example 1, but the quantity of powder in the discharged air amounted to only 0.3% of the total quantity of powder produced.

EXAMPLE 3

In the same device as used in Example 2, the atomizer wheel was replaced by a corresponding one, the ribs of which were 3 mm in height. The number of revolutions of the atomizer wheel were 20,000 rpm and the width of the gap between the ribs of the atomizer wheel and the topmost edge of the cyclone was 2 mm, in other respects the test conditions were analogous to those of Example 2.

The product obtained as of a similar quality as in the preceding Examples. Moreover, a microscopic examination showed that the powder had agglomerated and that the bulk density of the powder was higher as well as that the volume of occluded air was lower than normal.

The quantity of powder in the discharged air was measured to be approximately 0.1% of the total quantity.

EXAMPLE 4

A device was employed as illustrated in FIGS. 7 and 8, in which the cylindrical portion of the drying chamber had a diameter of 5.60 m and a height of 2.95 m.

The dimensions of the cyclone were the following:

| | |
|---|---|
| Total height | 2900 mm |
| Cyindrical height | 850 mm |
| Diameter | 1000 mm. |

The outlet was trumpet-shaped, the smallest diameter was 120 mm, the largest diameter 210 mm. The distance from cyclone to atomizer wheel was approximately 7 mm.

The air slides fitted in the bottom of the chamber formed an angle with the horizontal of 15° and their area amounted to 0.60 m².

The atomizer wheel had a diameter of 210 mm and the ribs on the underside were approximately 15 mm high. The number of revolutions of the atomizer wheel were 14,700 rpm.

Drying air having a temperature of 174°C was supplied at a rate of 14,500 kg/h and 1,000 kg/h of air at ambient temperature were supplied to the bottom of the chamber. The temperature of the exhausted air was 84°C.

A skimmed milk concentrate enriched with vegetable fat to form a total solids content of 40% was supplied at a rate of 480 kg/h. Thus the contents was 192 kg/h, of which 30% or 52 kg/h were vegetable fat.

198 kg/h of free-flowing powder with a temperature of 41°C was produced and the quantity of powder in the discharged air constituted less than 0.5% of the total quantity.

What we claim is:

1. A spray drying apparatus for the production of powder, comprising a drying chamber; a vertically axised rotatable atomizer wheel mounted in the upper portion of said chamber; means for supplying a solution or dispersion of solids to said atomizer wheel; means for supplying drying air to said drying chamber adjacent said wheel; an outlet for withdrawing powder from said drying chamber in the lowest thereof; a cyclone mounted vertically in said drying chamber and coaxially with said wheel for separating powder from spent drying air, said cyclone having (i) a bottom, peripheral tangential air-powder inlet communicating directly with the lower portion of said drying chamber, (ii) an air-powder outlet located subjacent to and coaxially with said atomizer wheel so as to provide a passage for air and powder discharge from said cyclone towards said atomizer wheel, (iii) and an air outlet for withdrawing spent drying air from within said cyclone; means for producing inflow of air and powder to said cyclone through said air-powder inlet; said air outlet providing for outflow of air from said cyclone and drying chamber.

2. An apparatus as claimed in claim 1, wherein said cyclone is mounted coaxially with the atomizer wheel.

3. An apparatus as claimed in claim 1, wherein said air-powder outlet of said cyclone and said means for supplying drying air to said chamber are located at opposite faces of the atomizer wheel.

4. An apparatus as claimed in claim 1, wherein the surface of said atomizer wheel, at which the air-powder outlet of the cyclone is located, is provided with vane means for increasing the blower effect of the rotating atomizer wheel.

5. An apparatus as claimed in claim 1 further comprising a duct for supplying a pressurized fluid, which duct terminates with a relatively narrow orifice in the air-powder outlet of the cyclone and coaxially therewith so as to produce an ejector effect assisting in carrying powder towards the atomizer wheel.

6. An apparatus as claimed in claim 1, wherein said cyclone air-powder inlet is of annular form and has guide blades mounted therein for imparting a rotary movement to the air and powder passing therethrough.

7. An apparatus as claimed in claim 6 wherein said air outlet of the cyclone is mounted centrally within said annular cyclone air inlet.

* * * * *

UNITED STATES PATENT OFFICE
CERTIFICATE OF CORRECTION

PATENT NO. 3,963,559
DATED June 15, 1976
INVENTOR(S) Mogens Petersen et al

It is certified that error appears in the above-identified patent and that said Letters Patent are hereby corrected as shown below:

In the heading the Assignee was omitted, it should be

-- AKTIESELSKABET NIRO ATOMIZER, Denmark --

Signed and Sealed this

Twelfth Day of October 1976

[SEAL]

Attest:

RUTH C. MASON
*Attesting Officer*

C. MARSHALL DANN
*Commissioner of Patents and Trademarks*